Patented Oct. 18, 1938

2,133,493

UNITED STATES PATENT OFFICE 2,133,493

LUBRICATING COMPOSITION AND METHOD OF MANUFACTURING THE SAME

Jones I. Wasson, Elizabeth, N. J., assignor to Standard Oil Development Company, a corporation of Delaware No Drawing. Application May 2, 1934, Serial No. 723,503

4 Claims. (Cl. 87—9)

The present invention relates to improved lubricants, especially to concentrated highly polymerized materials and oils thickened by addition of such polymers. The invention especially relates to a process for stabilizing such polymer concentrates and the oils containing same as well as to the stabilized products.

There have been many proposals for producing viscous fluid and/or solid lubricants by the use of heavy viscous aliphatic type polymers, among which the polymerized mineral, animal, vegetable and marine oils as well as organic acids and esters obtained therefrom have been mentioned, but it has been found that there are serious objections to the use of these materials. One of the main objections lies in the fact that these polymers are unstable and tend to polymerize further under favorable conditions. This results in the formation of a thick adherent skin even at low temperatures. Thus further polymerization and skin formation results in decreased solubility of the polymer itself and may result in precipitation or inability to completely dissolve as well as darkening in color and other forms of deterioration.

It has been found that the objections mentioned above can be prevented by adding to the polymer or to the polymer-containing oil relatively small amounts of free elements selected from a group of sulphur, selenium and tellurium. The amounts used may be very small indeed and it is altogether unobjectionable in the finished product. In some instances, the amounts may be as small as .002%, but generally it is more desirable to add somewhat greater quantities, say from .01 to .5%. These concentrations are sufficient to completely prevent skin formation and while thickening due to further polymerization may still occur to some degree, it is greatly diminished.

The types of polymers have been generally indicated above and they may be prepared in any desired manner. Some oils, especially those possessing drying or semi-drying qualities, may be polymerized by the action of heat alone in a well-known manner and to such an extent that the products are still freely soluble or easily dispersible in petroleum lubricating oils. The oils may also be polymerized by the action of high frequency, high voltage electric discharges. This process is quite well-known and need not be more particularly described except to state that the action occurs at low temperatures, preferably of the order of room temperature, but well below the decomposition point of the material and under vacuum so as to obtain a corona or silent electric discharge.

As has been indicated before, the present compositions are more stable than similar compositions which do not contain the free sulphur or its equivalent elements and this is noted not only in the polymer concentrate or grease containing large amounts of the polymer, but also in relatively dilute compositions in which the polymerization products is used in relatively small quantities to thicken lubricating oils and oils for other purposes.

The present compositions may include oxidation inhibitors of any of the well-known types, sludge dispersing agents, metal soaps and the like, such as are ordinarily used in the manufacture of blended oils for general lubrication or special processes. The following examples are presented to show the nature of the oils and their properties.

Example 1

A sample of rapeseed oil is polymerized to a substantial extent by passage of high frequency, high voltage electric discharges therethrough. To one sample of this polymerized oil is added .01% of free sulphur.

A blank sample of the polymer and the sample containing free sulphur are sealed and left for two weeks' time. The samples were then opened and it was found that the blank sample had formed a thick adherent insoluble skin and showed other indications of polymerization, while the other sample appeared to be in exactly the same condition as when it was sealed and there was no indication whatever of a skin formation.

The sample containing the sulphur could be readily dispersed or dissolved in hydrocarbon lubricating oils, while the blank sample went into admixture only with difficulty and the skin portion, at the surface, could not be made to dissolve at all.

Example 2

A portion of the polymer containing sulphur was left to stand in an open vessel exposed to sunlight and air for several months and after that time it was found still to show no indications of further polymerization. No skin had formed and the oil retained its color and was capable of dispersing or dissolving readily in hydrocarbon lubricating oils.

Example 3

Mineral lubricating oils containing about 15% of polymerized fish oil were allowed to stand exposed to light and air for several days. One sample contained .05% of free sulphur. This sample showed no perceptible change on examination, but the blank which contained no sulphur showed a thick adherent skin which could not be made to redissolve in the oil, and on stirring, separated from the solution. The oil became very dark in color after standing, i. e. the sample containing no sulphur.

The present invention deals with all types of oil soluble polymers which are unstable and which tend to polymerize to a higher degree. These polymers may be entirely hydrocarbons, for example polymers of paraffin wax, or they may contain oxygen or other element, for example the fatty oil polymers.

The polymers prepared for blending purposes are clean, free of asphalt, of good color and odor and of such molecular weight or degree of aggregation as to be freely soluble or dispersible in mineral oils without settling.

While the present composition is described as containing free sulphur or its equivalent elements, the actual state in which the sulphur is present is unknown. It is desirable to add the sulphur to the oily material just as described because it is much more effective than any sulphur compounds which have been tried.

The invention is not to be limited by any theory of the mechanism by which these oils are stabilized, nor to any particular oil polymer, but only to the following claims in which it is desired to claim all novelty inherent in the invention.

I claim:

1. Lubricating composition comprising a viscous oil of decreased tendency to form surface films in absence of oxygen, prepared by polymerizing a semi-drying to non-drying oil, and containing 0.01 to 0.5% of a free element selected from the group consisting of sulfur, selenium, and tellurium added after the polymerization.

2. Lubricating composition of decreased tendency to form surface films in absence of oxygen, comprising a mineral lubricating oil and a viscous oil prepared by polymerizing a semi-drying to non-drying oil and containing 0.01 to 0.5% of free sulfur added after the polymerization.

3. Lubricating composition comprising a viscous oil of decreased tendency to form surface films in absence of oxygen, prepared by voltolizing a semi-drying to non-drying oil of the type of vegetable, animal, and marine oils, and containing 0.01 to 0.5% of free sulfur added after the voltolization.

4. Lubricating composition comprising a viscous oil of decreased tendency to form surface films in absence of oxygen, prepared by voltolizing rapeseed oil and containing 0.01 to 0.5% of free sulfur added after the voltolization.

JONES I. WASSON.